US011926293B2

(12) United States Patent
Rangarajan et al.

(10) Patent No.: US 11,926,293 B2
(45) Date of Patent: Mar. 12, 2024

(54) MOUNTING MECHANISM TO ENABLE HITCHING A TOOL WITH THE FRAME OF A UTILITY VEHICLE

(71) Applicant: Mahindra and Mahindra Limited, Tamil Nadu (IN)

(72) Inventors: Sundararajan Rangarajan, Maharashtra (IN); Samu Sandberg, Pori (FI); Juho Ryyppö, Pori (FI); Hannu Rantala, Pori (FI)

(73) Assignee: Mahindra and Mahindra Limited, Kanchipuram (IN)

( * ) Notice: Subject to any disclaimer, the term of this patent is extended or adjusted under 35 U.S.C. 154(b) by 145 days.

(21) Appl. No.: 17/448,830

(22) Filed: Sep. 24, 2021

(65) Prior Publication Data
US 2023/0033485 A1 Feb. 2, 2023

(30) Foreign Application Priority Data

Aug. 2, 2021 (IN) .............................. 202141034721

(51) Int. Cl.
*B60S 9/00* (2006.01)
*B60S 9/04* (2006.01)

(52) U.S. Cl.
CPC ...................................... *B60S 9/04* (2013.01)

(58) Field of Classification Search
CPC ...... B60S 9/00; B60S 9/04; B60S 9/18; B66F 7/00
See application file for complete search history.

(56) References Cited

U.S. PATENT DOCUMENTS

| 4,123,038 | A  | * | 10/1978 | Meyers    | B66F 19/00   |
|           |    |   |         |           | 414/427      |
| 4,180,252 | A  | * | 12/1979 | Cushenbery| B23Q 1/5468  |
|           |    |   |         |           | 254/9 B      |
| 2008/0099739 | A1 | * | 5/2008 | Arzouman | B66F 13/00  |
|           |    |   |         |           | 254/8 B      |
| 2012/0319064 | A1 | * | 12/2012 | Selkowitz | B66C 1/36 |
|           |    |   |         |           | 254/338      |
| 2013/0037768 | A1 | * | 2/2013 | Hayes    | B66C 23/48   |
|           |    |   |         |           | 254/327      |
| 2013/0187108 | A1 | * | 7/2013 | Coccaro  | B66F 5/04    |
|           |    |   |         |           | 254/93 R     |
| 2013/0343849 | A1 | * | 12/2013 | Gobert  | A63B 71/0036 |
|           |    |   |         |           | 414/800      |
| 2023/0033485 | A1 | * | 2/2023 | Rangarajan | A01D 34/661 |

* cited by examiner

*Primary Examiner* — Lee D Wilson
(74) *Attorney, Agent, or Firm* — Cozen O'Connor (57) ABSTRACT

A mounting mechanism (100), to enable hitching a tool (101) with the frame of a utility vehicle, comprises front hooks (102), a locking mechanism (104), a lifting cradle assembly (106), and a frame attachment mechanism (108). The front hooks (102) and the locking mechanism is configured to detachably engage the front and the rear portion of the tool (101) respectively. The cradle assembly (106) is configured to be operatively engaged with the front hooks (102) and the locking mechanism (104). The frame attachment mechanism (108) is configured to be pivotally coupled to the lifting cradle assembly (106). The locking mechanism (104) is configured to be operated by lifting the cradle assembly (106) via pivotal motion between the cradle and the frame attachment mechanism (108) under force generated by the vehicle (1000) to hitch and lock the tool (101) with the frame of the vehicle (1000).

13 Claims, 10 Drawing Sheets

MOUNTING MECHANISM TO ENABLE HITCHING A TOOL WITH THE FRAME OF A UTILITY VEHICLE

CROSS REFERENCE TO RELATED APPLICATIONS

This application claims priority to Indian application number 202141034721, filed on Aug. 2, 2021, the disclosure of which is incorporated by reference herein in its entirety.

FIELD

The present disclosure relates to the field of mechanisms for enabling detachable mounting of mower deck or any other tool with the frame of utility vehicles.

DEFINITION

As used in the present disclosure, the following terms are generally intended to have the meaning as set forth below, except to the extent that the context in which they are used indicate otherwise.

The term "Utility Vehicle" refers to a vehicle that is powered by a motor and is designed for off-road use and is used as a farm, agricultural, or horticultural service, hauling vehicle such as tractors, power tillers, mowers and the like, generally having four or more wheels, with bench seating for the operator and a passenger, a steering wheel for control, and a cargo bed.

BACKGROUND

The background information herein below relates to the present disclosure but is not necessarily prior art.

Typically, utility vehicles including tractors, tillers, mowers, haulers and the like, use different kind of tools for agricultural work, farm, and horticulture and sometimes for lawn care. These tools are sometimes mounted under the frame of a utility vehicle, typically, between the front and rear tires. More particularly, these tools are attached to the frame of a tractor or other vehicle with mechanical linkages that allow the tool to be carried along with the vehicle. However, the conventional methods and mechanisms for coupling the tool to the vehicle frame is complex and is time consuming process and require many efforts.

Therefore, there is a need of a mounting mechanism that enables hitching of the tool with the vehicle frame and that alleviates the aforementioned drawbacks.

OBJECTS

Some of the objects of the present disclosure, which at least one embodiment herein satisfies, are as follows:

It is an object of the present disclosure to ameliorate one or more problems of the prior art or to at least provide a useful alternative.

An object of the present disclosure is to provide a mounting mechanism to enable hitching a tool with the frame of a utility vehicle.

Another object of the present disclosure is to provide a mounting mechanism that enables easy hitching of a tool to and from the frame of a utility vehicle.

Yet another object of the present disclosure is to provide a mounting mechanism that facilitates quick mounting of tool to the frame of a utility vehicle.

Other objects and advantages of the present disclosure will be more apparent from the following description when read in conjunction with the accompanying figures, which are not intended to limit the scope of the present disclosure.

SUMMARY

The present disclosure envisages a mounting mechanism to enable hitching a tool with the frame of a utility vehicle. The mounting mechanism comprises front hooks, a locking mechanism, a lifting cradle assembly, and a frame attachment mechanism. The front hooks are configured to be detachably coupled to operative front portion of the tool. The locking mechanism is configured to detachably engage the rear portion of the tool. The front hooks and the locking mechanism configured to form part of the tool. The lifting cradle assembly comprises a front horizontal rod and a rear horizontal rod.

The front horizontal rod configured to be operatively engaged with the front hooks and the rear horizontal rod configured to be operatively engaged with the locking mechanism. The frame attachment mechanism is configured to be pivotally coupled to the lifting cradle assembly. The frame attachment mechanism is configured to be attached to the vehicle bottom portion. The locking mechanism is configured to be operated by lifting the cradle assembly via pivotal motion between the cradle and the frame under force generated by the vehicle to engage the cradle assembly with the front hooks and the locking mechanism and operate the locking mechanism while lifting the tool under force generated by the vehicle, thereby securely locking and hitching the tool with the frame of vehicle.

In an embodiment, the locking mechanism includes a release lever, a first U-shaped guide plate, a second U-shaped guide plate, a first locking plate, a second locking plate, a spring, and a push spring actuator. The release lever has two operative ends with a notch configured on at least one end thereof. The first U-shaped guide plate has a through slot configured thereon. The second U-shaped guide plate has a through slot configured thereon. Each guide plate includes a plurality of pins extending therefrom. The ends of the release lever are received by the through slots of the first guide plate and second guide plate respectively. The first locking plate having a slot and a second locking plate having another slot operatively engaged with the first guide plate and the second guide plate respectively. The spring operatively coupled with at least one of the locking plates and further configured to lock the plates upon displacement of the plates with respect to the first and second U-shaped guide plates. The push spring actuator is operatively disposed with each of the locking plates. The push spring actuator is configured to hold the locking plates in open position and prevent free motion of the plates.

In an embodiment, locking mechanism is fixed at the rear portion of the tool to allow locking of the tool with the mechanism. In an alternate embodiment, the locking mechanism is fixed with the cradle to allow locking of the tool with the mechanism.

In an embodiment, each locking plate includes an arc slot configured thereon. Each arc slot is configured to receive the pin and allow the pin to be pressed therein and restrict movement of the plates under spring tension generated by the spring.

In an embodiment, the locking plates are configured to displace angularly or linearly to lock the tool with the mechanism at the bottom of the vehicle and prevent locking of the plates.

In an embodiment, the release lever is configured to be slightly displaced horizontally under force of the spring to allow the notch to come out of one of the through slots and rest against one of the locking plates and prevent the plates to be released back to open position and hold the tool in locked position.

In an embodiment, the spring and the notch configured on the lever prevent the locking plates to come back to its original unlock position, thereby holding the cradle under tension in a locked position with the tool.

In an embodiment, the lifting cradle assembly includes a pair of arms, the front and the rear horizontal rod, lift rods, a first lifting arm, a second lifting arm, and a rotational locking cam. The pair of arms extending from the two ends of the front horizontal rod respectively. The rear horizontal rod pivotally coupled with the arms. The rear horizontal rod is configured to be engaged with the slots of the locking plates respectively. The lift rods, one of each of the lift rods pivotally connected proximal to the front horizontal rod on either side of the cradle. The first lifting arm and the second lifting arm pivotally coupled between the lift rods and the rear horizontal rod. The rotational locking cam is rotatably coupled on either ends of the rear horizontal rod to allow rotation of the locking plates under force generated by the vehicle to allow locking of the cradle with the tool.

In an embodiment, the front hooks, the locking mechanism, the lifting cradle, and the frame attachment mechanism facilitate detachable mounting of the tool with the frame of the utility vehicle.

In an embodiment, the frame attachment mechanism includes a first carrier, a second carrier, a shaft, a first bell crank, a second bell crank, a first front bracket, a second front bracket, a first rear bracket, a second rear bracket, a first middle lever, a second middle lever, a first lever, a second lever, a first pull rod, a second pull rod, a first pull rod assembly, and a second pull rod assembly.

The first carrier has a through hole configured at central portion thereof. The second carrier has another through hole configured at central portion thereof. The shaft is configured to pass through the through holes and allow coupling between the first carrier and the second carrier. The first front bracket and the second front bracket coupled to front portion of the first carrier and the second carrier along with the first bell crank and the second bell crank respectively. The first rear bracket and the second rear bracket coupled at rear portion of the first carrier and the second carrier respectively. The first middle lever and the second middle lever pivotally coupled at the through holes of the first carrier and the second carrier respectively. The first lever and the second lever configured to be pivotally coupled to the first rear bracket and the second rear bracket respectively. The first pull rod and the second pull rod pivotally coupled with the first bell crank and the second bell crank respectively and the first middle lever and the second middle lever respectively. The first pull rod assembly and the second pull rod assembly, first end of each of the first rod assembly and the second pull rod assembly pivotally coupled with the first middle lever and the second middle lever respectively. The second end of each of the first pull rod assembly and the second pull rod assembly further configured to be coupled with the first lever and the second lever respectively.

In an embodiment, the first bell crank, the second bell crank are configured to be pivotally coupled with the lift rods respectively, and the first middle lever and the second middle lever are configured to be pivotally coupled with the first and second lifting arms respectively.

In an embodiment, the locking plates are displaced to locked position due to rotation of the cams against force of the push spring actuators while lifting.

In an embodiment, the lifting movement of the cams causes the pins of the plates to be pressed in the arc slots of the locking plates to displace the locking plates against spring force of the push actuator and lock the cradle with the tool.

In an embodiment, the pulling of the release lever against spring tension of spring allows the locking plates to displace to their original position to allow the rear horizontal rod to come out of the slots, thereby unlocking the cradle along with the frame attachment mechanism with the tool.

In an embodiment, pulling of the release lever causes the notches to move behind the plates and causes the plates to displace with the help of spring tension of the push spring actuator to unlock position and allow the rear horizontal rod to come out of the slots, thereby unlocking the cradle along with the frame attachment mechanism with the tool.

In an embodiment, the notch prevents unlocking of the locking plates upon vertical movement of the cradle with respect to the tool.

In an embodiment, the cam act against the force generated by the push actuator to angularly displace the locking plates.

In an embodiment, the first and second front brackets configured to be fixed or fastened to the vehicle to secure the mechanism at the bottom of the vehicle.

BRIEF DESCRIPTION OF THE ACCOMPANYING DRAWING

A mounting mechanism of the present disclosure to enable hitching a tool with the frame of a utility vehicle will now be described with the help of the accompanying drawing, in which.

LIST OF REFERENCE NUMERALS

1—First U-shaped guide plate
2—Second U-shaped guide plate
7—Shaft
8—Support
9—Locking lever 10—Arc slot
12—Pins
100—Mounting mechanism
101—Tool/Mower deck
102—Hooks
103—Pair of arms
104—Locking mechanism
104A—Release lever
104D—First locking plate
104E—Second locking plate
S1, S2—Slots
105—First bell crank
106—Cradle assembly
106A—Front horizontal rod
106B—Rear horizontal rod
106C, 106D—Lift rods
106E—First lifting arm
106F—Second lifting arm
107—Second bell crank
108—Frame attachment mechanism
108A—First carrier
108B—Second carrier
108C, 108D—Through hole
108G—First front bracket
108H—Second front bracket
110—Roller
115—First pull rod assembly
117—Second pull rod assembly
121—First rear bracket
123—Second rear bracket
125—First middle lever
127—Second middle lever
128—Power take-off (PTO) connection mechanism
129—First lever
131—Second lever
137—Push spring actuator
141—First pull rod
143—Second pull rod
145—Through slot
146—Power take-off (PTO) connector
1000—Utility vehicle/Tractor

DETAILED DESCRIPTION

Embodiments, of the present disclosure, will now be described with reference to the accompanying drawing.

Embodiments are provided so as to thoroughly and fully convey the scope of the present disclosure to the person skilled in the art. Numerous details, are set forth, relating to specific components, and methods, to provide a complete understanding of embodiments of the present disclosure. It will be apparent to the person skilled in the art that the details provided in the embodiments should not be construed to limit the scope of the present disclosure. In some embodiments, well-known processes, well-known apparatus structures, and well-known techniques are not described in detail.

The terminology used, in the present disclosure, is only for the purpose of explaining a particular embodiment and such terminology shall not be considered to limit the scope of the present disclosure. As used in the present disclosure, the forms "a," "an," and "the", may be intended to include the plural forms as well, unless the context clearly suggests otherwise. The terms "including," and "having," are open ended transitional phrases and therefore specify the presence of stated features, operations, elements and/or components, but do not forbid the presence or addition of one or more other features, operations, elements, components, and/or groups thereof.

The present disclosure envisages a mounting mechanism 100 to enable hitching a tool with the frame of a utility vehicle. The mounting mechanism 100 (herein after referred to as "mounting mechanism 100") is now described with reference to FIG. 1 through FIG. 11.

The mounting mechanism 100 comprises front hooks 102, a locking mechanism 104, a lifting cradle assembly 106, and a frame attachment mechanism 108.

The lifting cradle assembly 106 and the frame attachment mechanism 108 are pivotally fixed to the frame of the vehicle 1000. In an embodiment, initially a tool 101 along with the front hooks 102 and the locking mechanism 104 is separated. The utility vehicle 1000 along with the cradle assembly 106 and the frame attachment mechanism 108 is driven over the tool 101 and the tool 101 is hitched with the cradle assembly 106 via force generated by the vehicle 1000.

The locking mechanism 104 is configured to be operated by the lifting cradle assembly 106 via pivotal motion between the cradle assembly 106 and the frame 108 under force generated by the vehicle 1000 to engage the cradle assembly 106 with the front hooks 102 and the locking mechanism 104 and operate the locking mechanism 104 while lifting the tool 101 under hydraulic force, thereby hitching and securely locking the tool 101 with the frame of vehicle 1000. In an embodiment, the locking mechanism 104 is securely fixed at the rear portion of the tool 101 to allow locking of the tool 101 with the mechanism 100. In an alternate embodiment, the locking mechanism 104 may be fixed with the cradle assembly 106 to allow locking of the tool 101 with the mechanism 100. In an embodiment, the force generated by the vehicle 1000 for locking the tool 101 can be electric, or hydraulic.

Figure 2:
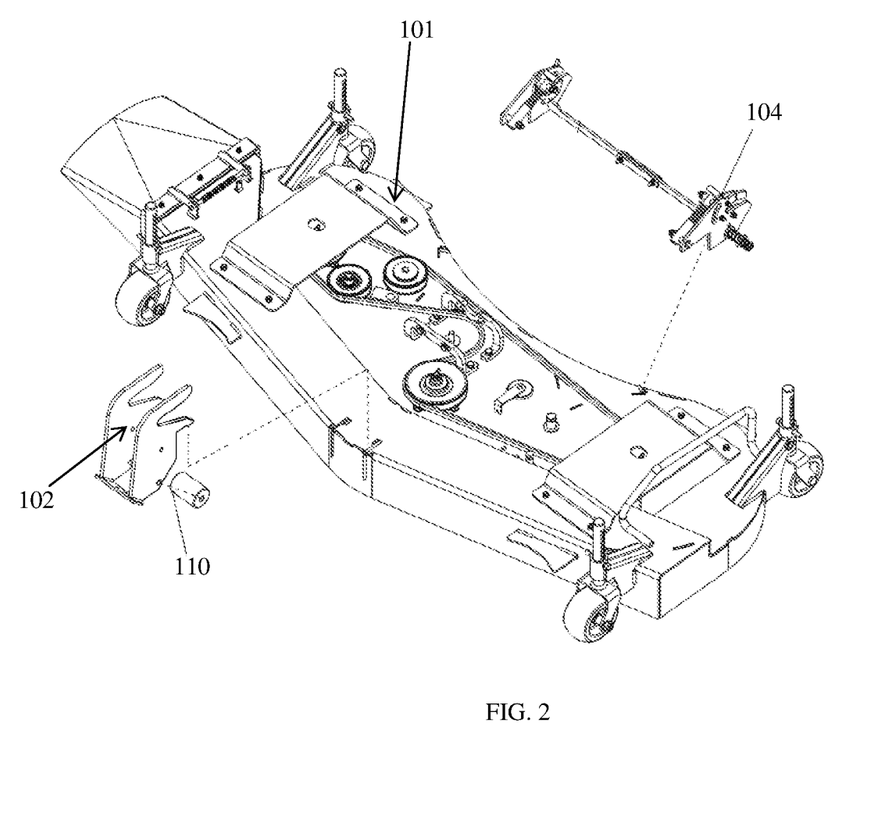
FIG. 2 illustrates an exploded isometric view of front hooks and a locking mechanism being coupled at front and rear portion of a tool respectively.

The front hooks 102 are configured to be detachably coupled to operative front portion of the tool 101. In an embodiment, the hooks 102 are engaged with a roller 110 to allow the hooks 102 to pivot with respect to the tool 101. The locking mechanism 104 is configured to be detachably engage with the rear portion of the tool 101. The front hooks 102 and the locking mechanism 104 configured to form part of the tool 101. In an embodiment, the front hooks 102 and the roller 110 help the tool 101 to go over any obstacle rather than hitting the obstacle. Also, the front hooks 102 allow the tool 101 to rise a bit from the ground surface.

Figure 4A:
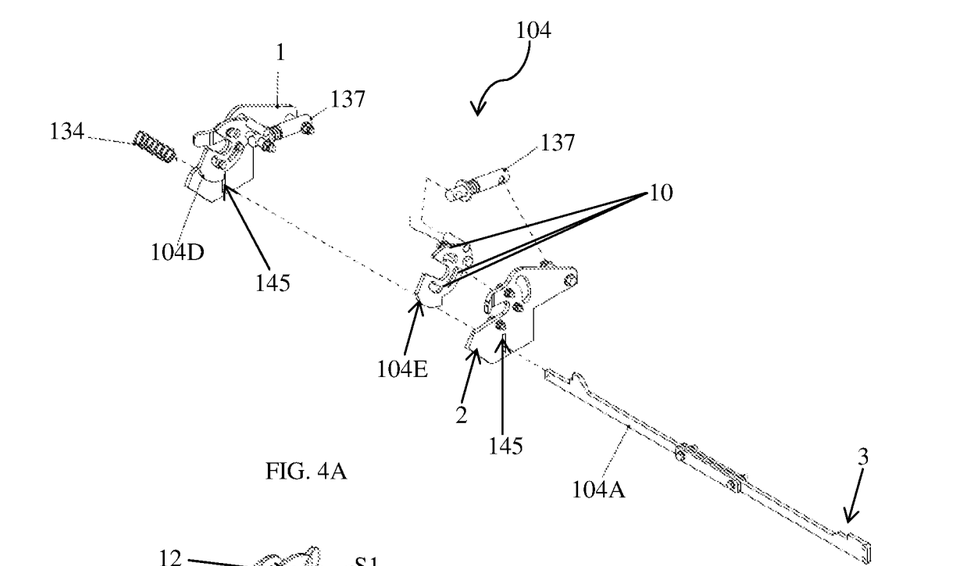
FIG. 4A illustrates an exploded isometric view of the locking mechanism of FIG. 2.
Figure 4B:
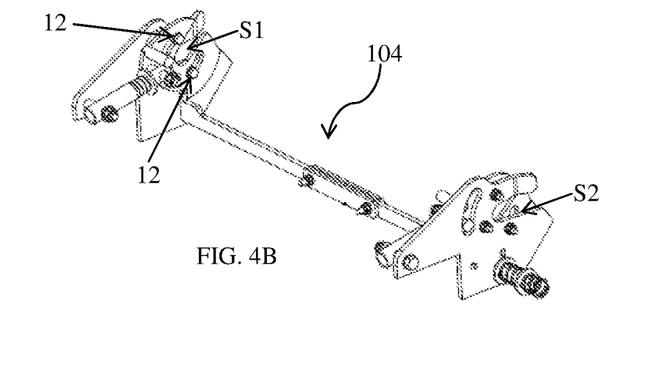
FIG. 4B illustrates an isometric view of a complete locking mechanism of FIG. 2.
Figure 5:
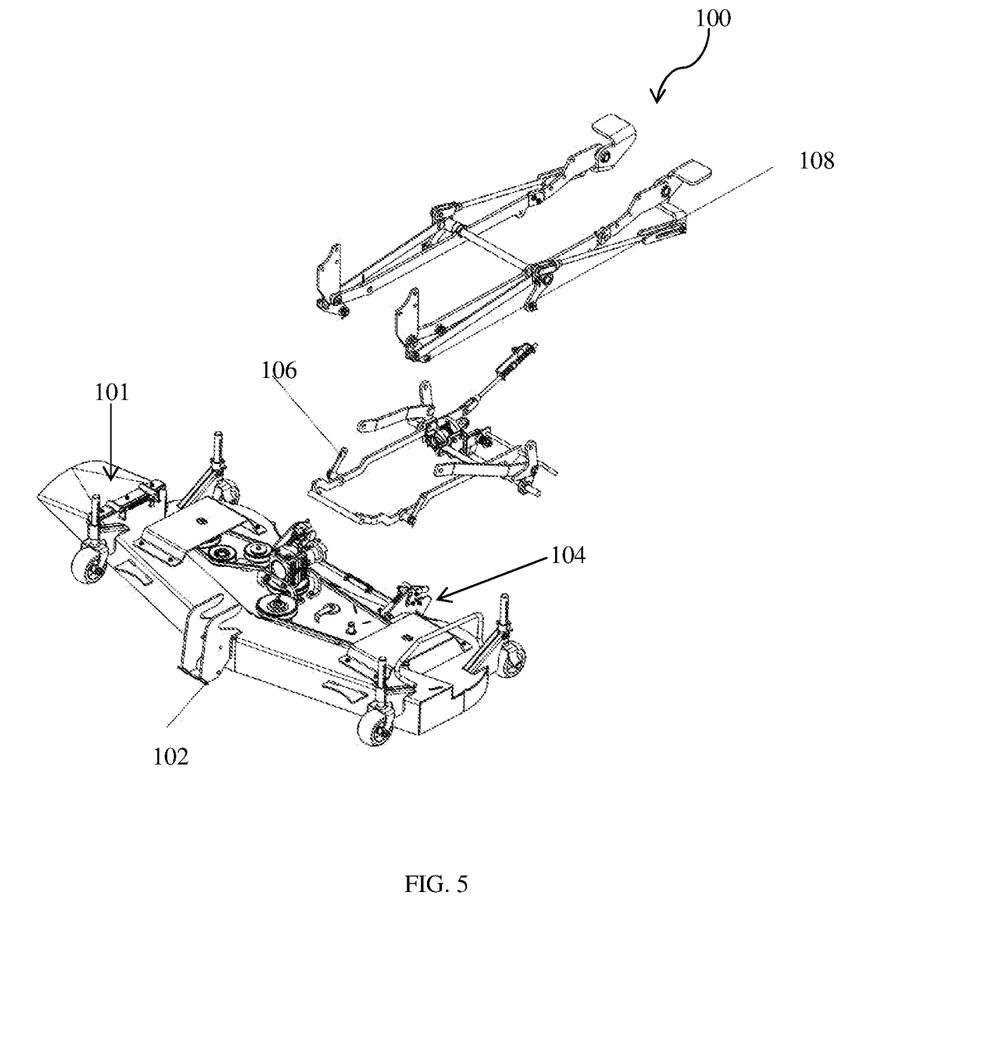
FIG. 5 illustrates an isometric view of the frame attachment mechanism of FIG. 3 and the cradle assembly of FIG. 1 being coupled with the tool.
Figure 6:
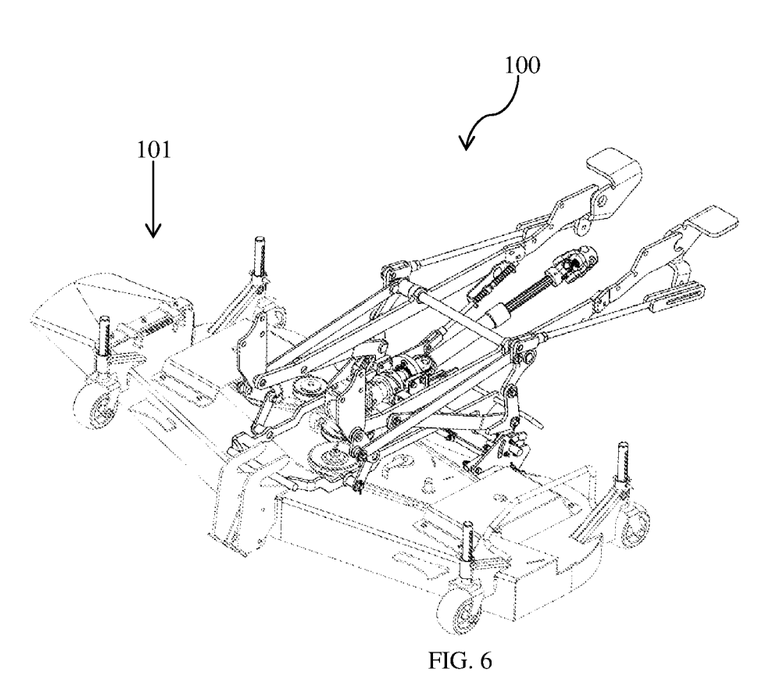
FIG. 6 illustrates an isometric view of the complete mounting mechanism coupled with the tool.
Figure 7:
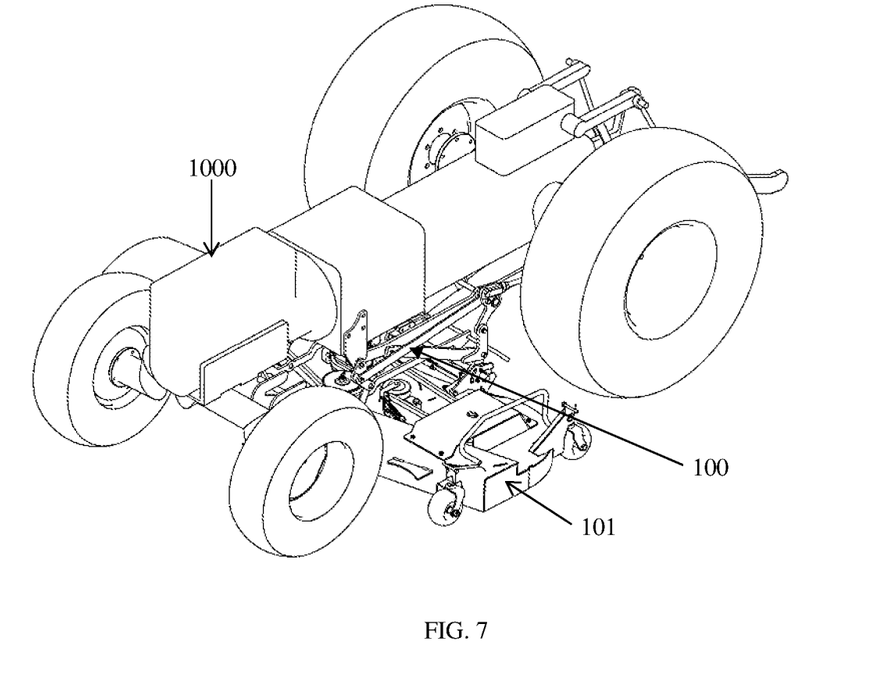
FIG. 7 illustrates an isometric view of the tool being hitched with the frame of a utility vehicle using the mechanism of FIG. 6.
Figure 8:
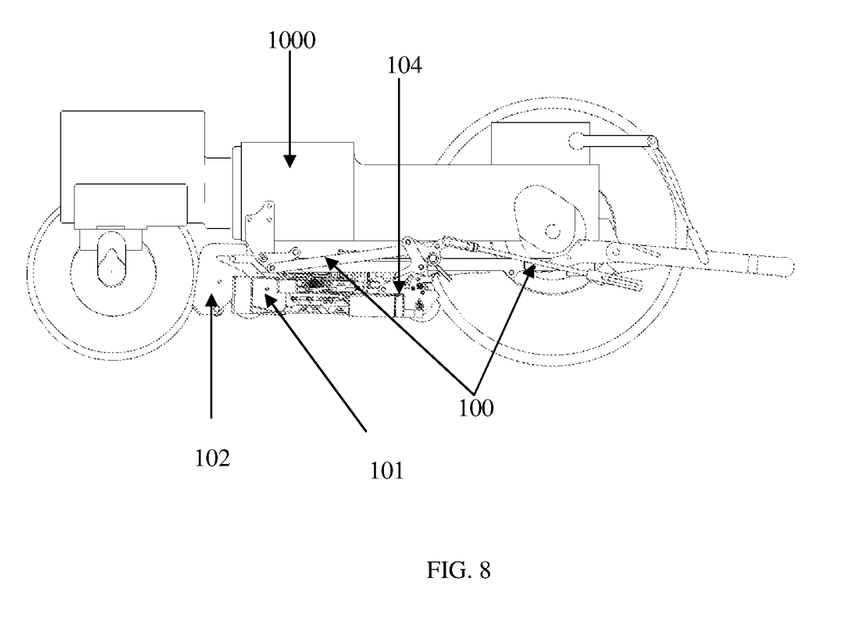
FIG. 8 and FIG. 9 illustrate a side view of the mechanism coupled with the tool and the frame of the utility vehicle.
Figure 9:
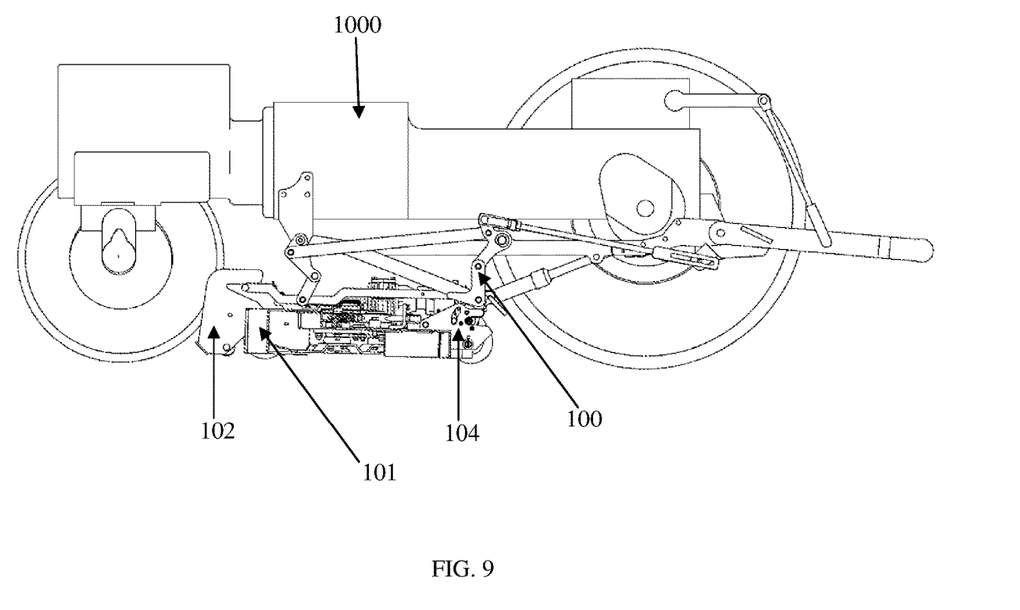
Figure 10:
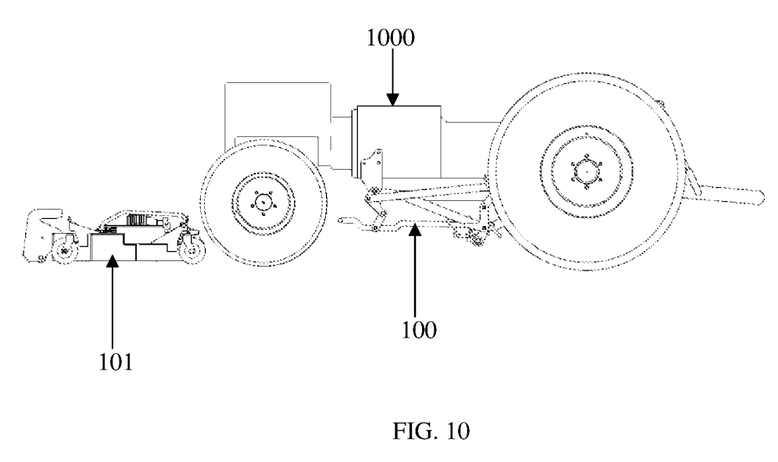
FIG. 10 and FIG. 11 illustrate a side view depicting the mechanism being coupled with the tool by hitching the utility vehicle.
Figure 11:
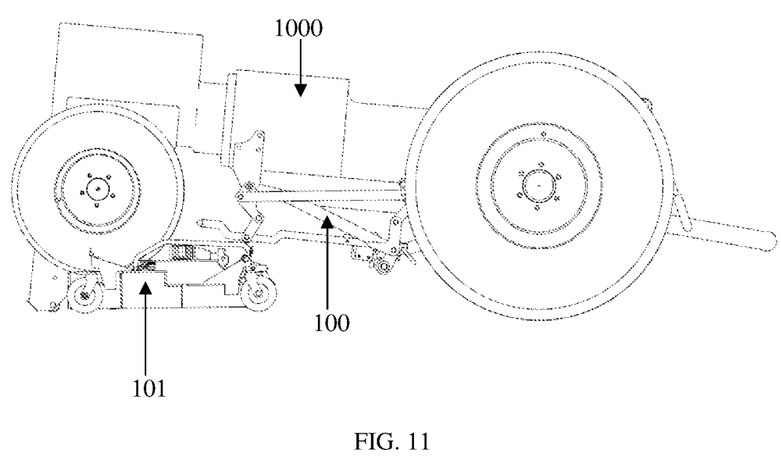

The locking mechanism 104 includes a release lever 104A, a first U-shaped guide plate 1, a second U-shaped guide plate 2, a first locking plate 104D, a second locking plate 104E, a spring 134, and a push spring actuator 137. The release lever 104A has two operative ends with a notch 3 configured on at least one end thereof. The first U-shaped guide plate 1 has a through slot 145 configured thereon. The second U-shaped guide plate 2 has a through slot 145 configured thereon. Each guide plate 1, 2 includes a plurality of pins 12 extending therefrom. The ends of the release lever 104A are received by the through slots 145 of the first guide plate 1 and second guide plate 2 respectively. The first locking plate 104D having a slot S1 and a second locking plate 104E having another slot S2 rotatably engaged with the first guide plate 1 and the second guide plate 2 respectively. The spring 134 operatively coupled with at least one of the locking plates 104D, 104E and further configured to lock the plates 104D, 104E upon displacement of the plates 104D, 104E with respect to the first and second U-shaped guide plates 1, 2. The push spring actuator 137 is operatively disposed with each of the locking plates 104D, 104E. The push spring actuator 137 is configured to hold the locking plates 104D, 104E in open position and prevent free motion of the plates 104D, 104E. In an embodiment, the locking plates 104D, 104E are configured to displace angularly or linearly to lock the tool 101 with the mounting mechanism 100 at the bottom of the vehicle 1000 and prevent unlocking of the plates 104D, 104E. In an embodiment, the release lever 104A is configured to be slightly displaced horizontally under force of the spring 134 to allow the notch 3 to come out of one of the through slots 145 and rest against one of the locking plates 104D, 104E and prevent the plates 104D, 104E from releasing back to open position and hold the locking plates 104D, 104E in locked position. When the locking plates 104D, 104E rotate, the smaller radius edge in locking plates 104D, 104E allows passage of the notch 3, and the plates 104D, 104E are lockingly engaged with the spring 134. In an embodiment, the spring 134 and the notch 3 configured on the lever 104A prevent the locking plates 104D, 104E to come back to its original unlock position, thereby holding the cradle assembly 106 under tension in a locked position with the tool 101.

Figure 1:
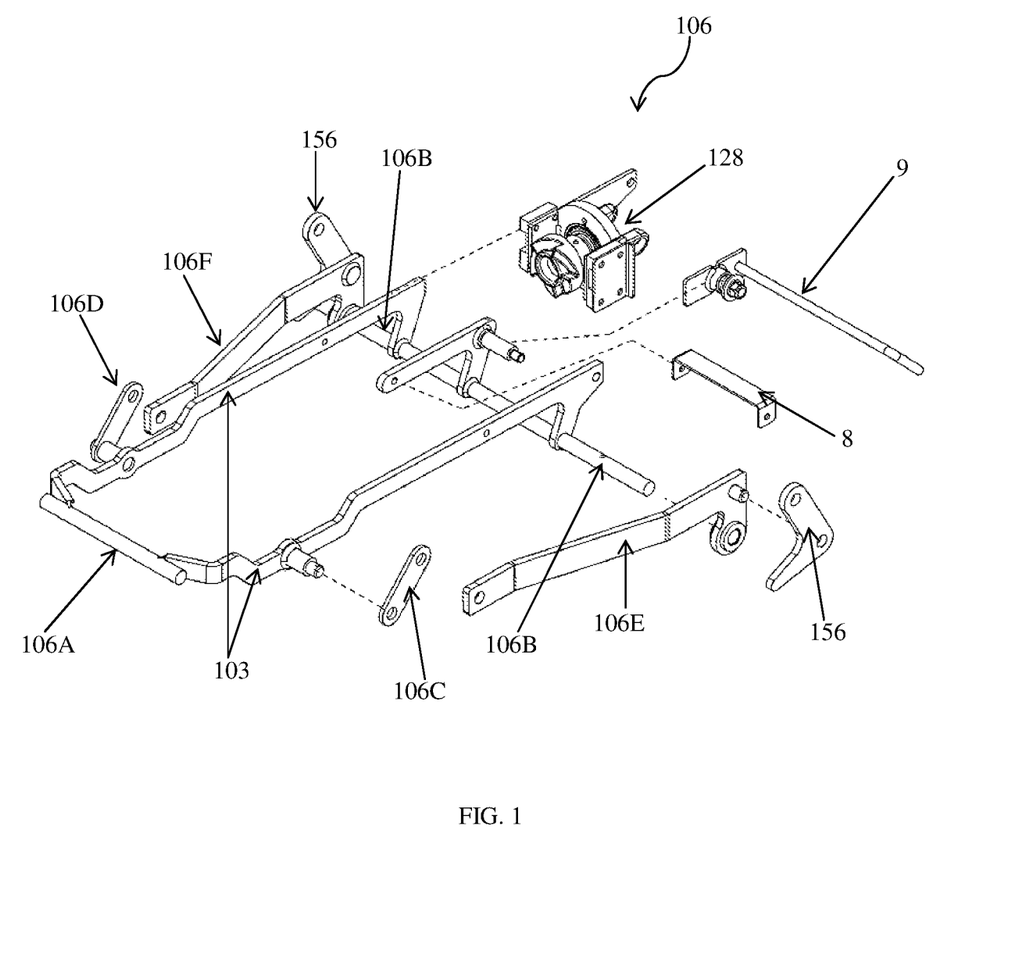
FIG. 1 illustrates an exploded isometric view of a lifting cradle assembly.

The lifting cradle assembly 106 comprises a front horizontal rod 106A and a rear horizontal rod 106B. The front horizontal rod 106A configured to be operatively engaged with the front hooks 102 and the rear horizontal rod 1066 configured to be operatively engaged with the locking mechanism 104. In an embodiment, the lifting cradle assembly 106 includes a pair of arms 103, the front and the rear horizontal rods 106A, 106B, lift rods 106C, 106D, a first lifting arm 106E, a second lifting arm 106F, and a rotational locking cam 156.

The pair of arms 103 extending from the two ends of the front horizontal rod 106A respectively. The rear horizontal rod 106B pivotally coupled with the arms 103. The rear horizontal rod 106B is configured to be engaged with the slots S1 and S2 of the locking plates 104D, 104E respectively. The lift rods 106C, 106D, one of each of the lift rods 106C, 106D pivotally connected proximal to the front horizontal rod 106A on either sides of the cradle 106. The first lifting arm 106E and the second lifting arm 106F pivotally coupled between the lift rods 106C, 106D and the rear horizontal rod 106B. The rotational locking cam 156 is rotatably coupled on either ends of the rear horizontal rod 106B to allow rotation of the locking plates 104D, 104E under force generated by the vehicle 1000 to allow locking of the cradle assembly 106 with the tool 101.

In an embodiment, the rear portion of the lifting cradle assembly 106 further includes a support 8 and a locking lever 9. The support 8 is configured to allow a power take-off (PTO) connector 146 and the power take-off (PTO) connection mechanism 128 to be coupled at the rear portion of the cradle 106.

Figure 3:
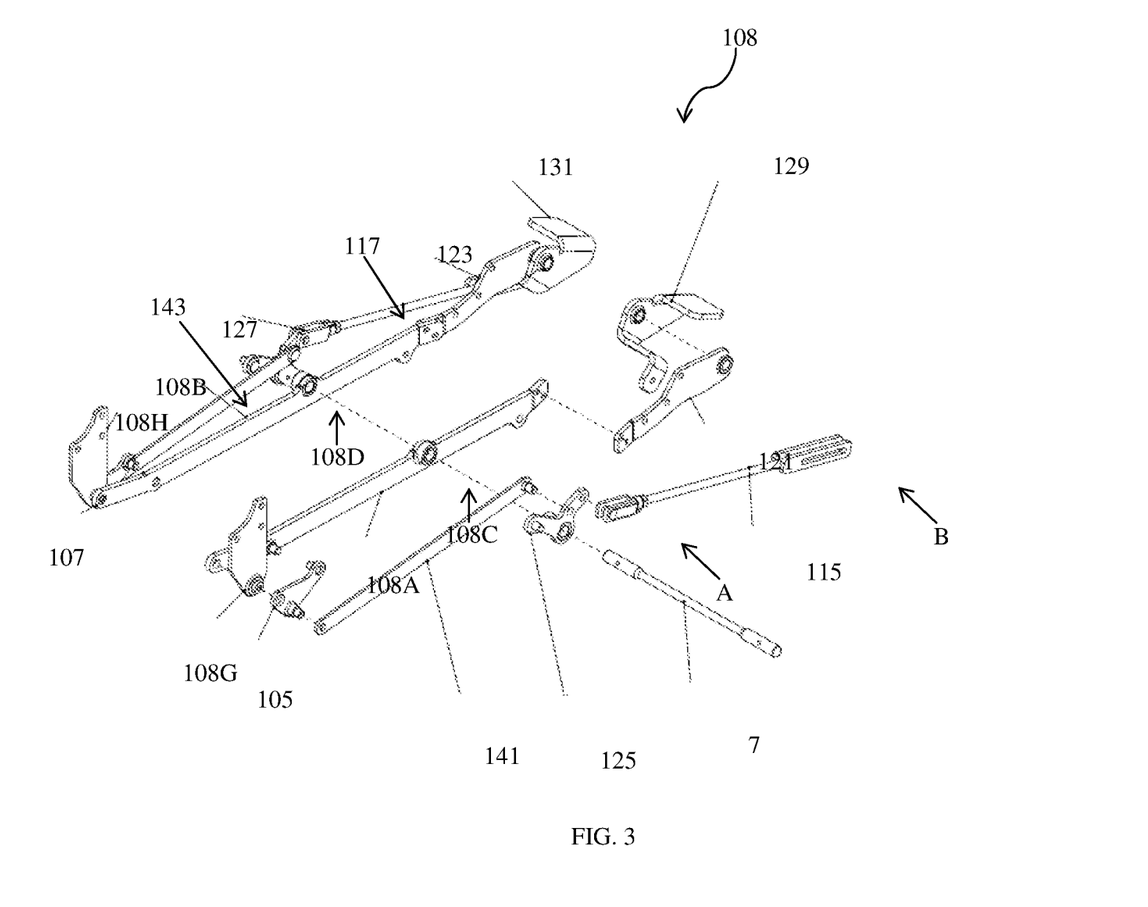
FIG. 3 illustrates an exploded isometric view of a frame attachment mechanism.

The frame attachment mechanism 108 is configured to be pivotally coupled to the lifting cradle assembly 106. The frame attachment mechanism 108 is configured to be attached to the vehicle bottom portion. In an embodiment, the frame attachment mechanism 108 includes a first carrier 108A, a second carrier 108B, a shaft 7, a first bell crank 105, a second bell crank 107, a first front bracket 108G, a second front bracket 108H, a first rear bracket 121, a second rear bracket 123, a first middle lever 125, a second middle lever 127, a first lever 129, a second lever 131, a first pull rod 141, a second pull rod 143, a first pull rod assembly 115, and a second pull rod assembly 117. In an embodiment, the first and second front brackets 108G, 108H configured to be fixed to the vehicle 1000 to secure the mounting mechanism 100 at the bottom of the vehicle 1000.

The first carrier 108A has a through hole 108C configured at central portion thereof. The second carrier 108B has another through hole 108D configured at central portion thereof. The shaft 7 is configured to pass through the through holes 108C, 108D and allow coupling between the first carrier 108A and the second carrier 108B. The first front bracket 108G and the second front bracket 108H coupled to front portion of the first carrier 108A and the second carrier 108B along with the first bell crank 105 and the second bell crank respectively 107. The first rear bracket 121 and the second rear bracket 123 coupled at rear portion of the first carrier 108A and the second carrier 108B respectively. The first middle lever 125 and the second middle lever 127 pivotally coupled at the through holes 108C, 108D of the first carrier 108A and the second carrier 108B respectively. The first lever 129 and the second lever 131 configured to be pivotally coupled to the first rear bracket 121 and the second rear bracket 123 respectively. The first pull rod 141 and the second pull rod 143 pivotally coupled with the first bell crank 105 and the second bell crank 107 respectively and the first middle lever 125 and the second middle lever 127 respectively. The first pull rod assembly 115 and the second pull rod assembly 117, first end A of each of the first pull rod assembly 115 and the second pull rod assembly 117 pivotally coupled with the first middle lever 125 and the second middle lever 127 respectively. The second end B of each of the first pull rod assembly 115 and the second pull rod assembly 117 further configured to be coupled with the first lever 129 and the second lever 131 respectively.

In an embodiment, the first bell crank 105, the second bell crank 107 are configured to be pivotally coupled with the lift rods 106C, 106D respectively, and the first middle lever 125 and the second middle lever 127 are configured to be pivotally coupled with the first and second lifting arms 106E, 106F respectively.

In an embodiment, the locking plates 104D, 104E are displaced to locked position due to rotation of the cams 156 against force of the push spring actuator 137 while lifting. In an embodiment, the lifting movement of the cams 156 cause the pins 12 to be pressed in the arc slots 10 of the plates 104D, 104E against spring force of the push spring actuator 137 and lock the cradle assembly 106 with the tool 101. While lifting, the cam 156 starts pushing locking plates 104D, 104E which turns them to close the slots and secure the horizontal slot in place. At the same time when the locking plates 104D, 104E have turned enough the two notches 3 in release lever 104A moves into locking position which prevents the locking plates 104D, 104E to be released back in open position. The release lever 104A has already been under tension by spring 134 because it has been behind the locking mechanism 104.

In an embodiment, the pulling of the lever 104A against spring tension of spring 134 allows the locking plates 104D, 104E to displace to their original position to allow the rear horizontal rod 106B to come out of the slots S1, S2, thereby unlocking the cradle assembly 106 along with the frame attachment mechanism 108 with the tool 101. When the mower deck/tool 101 is on ground, just by pulling the release lever 104A causes the notches 3 to move behind the locking plates 104D, 104E, and the locking plates 104D, 104E starts to turn into open position with the help of spring tension of the push spring actuator 137.

In an embodiment, the notch 3 prevents unlocking of the locking plates 104D, 104E upon vertical movement of the cradle assembly 106 with respect to the tool 101.

In an embodiment, the cams 156 act against the force generated by the push actuator 137 to angularly displace the locking plates 104D, 104E.

The front hooks 102, the locking mechanism 104, the lifting cradle 106, and the frame attachment mechanism 108 facilitate detachable mounting of the tool with the frame of the utility vehicle.

Thus, the mounting mechanism 100 facilitates easy coupling of the tool such as the mower deck 101 with the frame of the utility vehicle 1000 in less amount of time and with less efforts as compared to the conventional mechanisms.

The foregoing description of the embodiments has been provided for purposes of illustration and not intended to limit the scope of the present disclosure. Individual components of a particular embodiment are generally not limited to that particular embodiment, but, are interchangeable. Such variations are not to be regarded as a departure from the present disclosure, and all such modifications are considered to be within the scope of the present disclosure.

TECHNICAL ADVANCEMENTS AND ECONOMICAL SIGNIFICANCE

The present disclosure described herein above has several technical advantages including, but not limited to, the realization of a mounting mechanism to enable hitching a tool with the frame of a utility vehicle, that:
 enables easy mounting of tool with the frame of the utility vehicle;
 facilitates quick mounting of tool; and
 helps mounting of the tool in effortless manner.

The embodiments herein, the various features, and advantageous details thereof are explained with reference to the non-limiting embodiments in the following description. Descriptions of well-known components and processing techniques are omitted so as to not unnecessarily obscure the embodiments herein. The examples used herein are intended merely to facilitate an understanding of ways in which the embodiments herein may be practiced and to further enable those of skill in the art to practice the embodiments herein. Accordingly, the examples should not be construed as limiting the scope of the embodiments herein.

The disclosure has been described with reference to the accompanying embodiments which do not limit the scope and ambit of the disclosure. The description provided is purely by way of example and illustration.

The embodiments herein and the various features and advantageous details thereof are explained with reference to the non-limiting embodiments in the following description. Descriptions of well-known components and processing techniques are omitted so as to not unnecessarily obscure the embodiments herein. The examples used herein are intended merely to facilitate an understanding of ways in which the embodiments herein may be practiced and to further enable those of skill in the art to practice the embodiments herein. Accordingly, the examples should not be construed as limiting the scope of the embodiments herein.

The foregoing description of the specific embodiments so fully reveals the general nature of the embodiments herein that others can, by applying current knowledge, readily modify and/or adapt for various applications such specific embodiments without departing from the generic concept, and, therefore, such adaptations and modifications should and are intended to be comprehended within the meaning and range of equivalents of the disclosed embodiments. It is to be understood that the phraseology or terminology employed herein is for the purpose of description and not of limitation. Therefore, while the embodiments herein have been described in terms of preferred embodiments, those skilled in the art will recognize that the embodiments herein can be practiced with modification within the spirit and scope of the embodiments as described herein.

While considerable emphasis has been placed herein on the components and component parts of the preferred embodiments, it will be appreciated that many embodiments can be made and that many changes can be made in the preferred embodiments without departing from the principles of the disclosure. These and other changes in the preferred embodiment as well as other embodiments of the disclosure will be apparent to those skilled in the art from the disclosure herein, whereby it is to be distinctly understood that the foregoing descriptive matter is to be interpreted merely as illustrative of the disclosure and not as a limitation.

The invention claimed is:

1. A mounting mechanism configured to enable hitching a tool with a frame of a utility vehicle, said mounting mechanism comprising:
 front hooks configured to be detachably coupled to operative front portion of said tool;
 a locking mechanism configured to detachably engage with the rear portion of said tool, said front hooks and said locking mechanism configured to form part of said tool;
 a lifting cradle assembly comprising a front horizontal rod and a rear horizontal rod, said front horizontal rod configured to be operatively engaged with said front hooks and said rear horizontal rod configured to be operatively engaged with said locking mechanism; and
 a frame attachment mechanism configured to be pivotally coupled to said lifting cradle assembly, said frame attachment mechanism configured to be attached to the vehicle bottom portion, wherein said locking mechanism is configured to be operated by lifting said cradle assembly via pivotal motion between said cradle assembly and said frame attachment mechanism under force generated by said vehicle to engage said cradle assembly with said front hooks and said locking mechanism, and operate said locking mechanism while lifting said tool under force generated by said vehicle, thereby securely locking and hitching said tool with the frame of said vehicle;
 wherein said locking mechanism includes:
  a release lever having two operative ends with a notch configured on at least one end thereof;
  a first U-shaped guide plate having a through slot configured thereon;
  a second U-shaped guide plate having a through slot configured thereon, each guide plate includes a plurality of pins extending therefrom, said operative ends of said lever are received by said through slots of said first guide plate and second guide plate respectively;
  a first locking plate having a first slot and a second locking plate having a second slot operatively engaged with said first guide plate and said second guide plate respectively;
  a spring operatively coupled with at least one of said plates and further configured to lock said plates upon displacement of said plates with respect to said first and second U-shaped guide plates; and
  a push spring actuator operatively disposed with each of said locking plates, said push spring actuator configured to hold said locking plates in open position and prevent free motion of said plates.

2. The mounting mechanism as claimed in claim 1, wherein each locking plate includes a plurality of arc slots configured thereon, each arc slot is configured to receive said pin and allow said pin to be pressed therein and restrict movement of said plates under spring tension generated by said push spring actuator.

3. The mounting mechanism as claimed in claim 2, wherein lifting movement of a cam causes said pins of said plates to be pressed in said arc slots of said plates to displace the plates against spring force of said push actuator and lock said cradle assembly with said tool.

4. The mounting mechanism as claimed in claim 1, wherein said locking plates are configured to displace angularly or linearly to lock said tool with said mechanism at the bottom of said vehicle.

5. The mounting mechanism as claimed in claim 1, wherein said release lever configured to displace horizontally under force of said spring to allow said notch to come out of through slot in locking position and rest against one of said locking plates to prevent said locking plates to be released back to open position and hold said tool in locked position.

6. The mounting mechanism as claimed in claim 1, wherein said spring and said notch configured on said lever prevent said locking plates to come back to its original unlock position, thereby holding said cradle assembly under tension in a locked position with said tool.

7. The mounting mechanism as claimed in claim 1, wherein said lifting cradle assembly includes:
   a pair of arms extending from said two ends of said front horizontal rod respectively;
   said rear horizontal rod pivotally coupled with said arms, said rear horizontal rod configured to be engaged with said slots of said locking plates respectively;
   lift rods, one of said lift rods pivotally connected proximal to said front horizontal rod on either side of said cradle assembly;
   a first lifting arm and a second lifting arm pivotally coupled between said lift rods and said rear horizontal rod; and
   a rotational locking cam rotatably coupled on either ends of said rear horizontal rod to allow rotation of said locking plates under force generated by said vehicle to allow locking of said cradle assembly with said tool.

8. The mounting mechanism as claimed in claim 7, wherein said cam acts against the spring tension of said push spring actuator to displace said locking plates to lock position.

9. The mounting mechanism as claimed in claim 1, wherein pulling of said release lever causes the notches to move behind the plates and causes the plates to displace with the help of spring tension of said push spring actuator to unlock position and allow said rear horizontal rod to come out of said slots, thereby unlocking said cradle assembly along with said frame attachment mechanism with said tool.

10. The mounting mechanism as claimed in claim 9, wherein said notch prevents unlocking of the locking plates upon vertical movement of said cradle assembly with respect to said tool.

11. The mounting mechanism as claimed in claim 1, wherein said frame attachment mechanism includes:
   a first carrier having a through hole configured at central portion thereof;
   a second carrier having another through hole configured at central portion thereof;
   a shaft configured to pass through said through holes allow coupling between said first carrier and said second carrier;
   a first bell crank;
   a second bell crank;
   a first front bracket and a second front bracket coupled to front portion of said first carrier and said second carrier along with said first bell crank and said second bell crank respectively;
   a first rear bracket and a second rear bracket coupled at rear portion of said first carrier and said second carrier respectively;
   a first middle lever and a second middle lever pivotally coupled at said through holes of said first carrier and said second carrier respectively;
   a first lever and a second lever configured to be pivotally coupled to said first rear bracket and said second rear bracket respectively;
   a first pull rod and a second pull rod pivotally coupled with said first bell crank and said second bell crank and said first middle lever and said second middle lever respectively; and
   a first pull rod assembly and a second pull rod assembly, one end of each of said first rod assembly and said second pull rod assembly pivotally coupled with said first middle lever and said second middle lever respectively, and an other end of said first pull rod assembly and said second pull rod assembly further configured to be coupled with said first lever and said second lever respectively.

12. The mounting mechanism as claimed in claim 11, wherein said first bell crank, said second bell crank are configured to be pivotally coupled with said lift rods respectively, and said first middle lever and said second middle lever are configured to be pivotally coupled with said first and second lifting arms respectively to convert rotation of said cradle assembly movement into vertical movement.

13. The mounting mechanism as claimed in claim 11, wherein said first and second front brackets are configured to be fixed or fastened to said vehicle to secure said mechanism at the bottom of said vehicle.

* * * * *